United States Patent [19]

Gupta et al.

[11] Patent Number: 4,868,274

[45] Date of Patent: Sep. 19, 1989

[54] POLYANHYDRIDE FROM CARBOXY ARYLOXY ALKANOIC ACID

[75] Inventors: Balaram Gupta; Gordon W. Calundann, both of North Plainfield, N.J.

[73] Assignee: Hoechst Celanese Corp., Somerville, N.J.

[21] Appl. No.: 198,803

[22] Filed: May 23, 1988

[51] Int. Cl.$^4$ ............................................. C08G 67/04
[52] U.S. Cl. ..................... 528/206; 528/86; 528/207; 528/271
[58] Field of Search .................. 528/206, 207, 86, 271

[56] References Cited

U.S. PATENT DOCUMENTS 4,546,152 10/1985 Koelmel et al. .................... 525/437

OTHER PUBLICATIONS

K. W. Leong et al., Macromolecules, 20(4), 705–712, Apr. 1987.

K. W. Leong et al., Biomaterials, vol. 7, Sep. 1986, pp. 364–371.

Kito et al., Kogyo Kagaku Zasshi 1971, 74(11), 2312–2315, (Abstracted in C.A. 76(9): 45892c, 1972).

Shamilov et al., Deposited Doctoral Dissertation SPSTL Khp–D82, 6 Pages (1982) (Abstracted in C.A. 101(3): 23072t).

*Primary Examiner*—Harold D. Anderson
*Attorney, Agent, or Firm*—Marvin Turken

[57] ABSTRACT

There are provided novel homopolyanhydrides of carboxyaryloxyalkanoic acids, e.g. p-carboxyphenoxyacetic acid or 6-(p-carboxyphenoxy)hexanoic acid, capable of being formed into shaped articles. The homopolyanhydrides may be prepared by heating under reflux a solution of the acid monomer in acetic anhydride to form a mixed anhydride of the acid monomer and acetic acid and melt polycondensing the prepolymer by heating it under vacuum in an inert atmosphere. Due to their property of hydrolytic cleavage at predictable rates, the homopolyanhydrides are suitable as polymer matrices providing for the controlled release of an agent such as a drug.

15 Claims, No Drawings

POLYANHYDRIDE FROM CARBOXY ARYLOXY ALKANOIC ACID

BACKGROUND OF THE INVENTION

1. Field of the Invention

This invention relates to a new class of polyanhydrides.

2. Background Information

Various polyanhydrides are known in the art as described in the references discussed in the Description of Related Art given hereinafter. Some of these have been used for the controlled release of agents such as drugs, e.g. poly [bis (p-carboxyphenoxy) alkane anhydrides], and copolyanhydrides of bis (p-carboxyphenoxy) alkanes with sebacic acid. However, a disadvantage of some of these known polyanhydrides is their uneven rate of hydrolytic cleavage at different temperatures, with substantially higher rates of cleavage occurring at temperatures above 0° C. than at 0° C. or below. A possible cause of this lack of uniformity of hydrolytic cleavage of known polyanhydrides which can be formed into polymer matrices suitable for controlled release of a drug or other agent, is the nature of the repeating units making up the polymers which are derived from the monomer or monomers used to prepare the polymer. Thus, both terminal groups of at least some of the repeating units making up all or most of the known polyanhydrides used for the controlled release of drugs or other functional substances, are hydrophilic anhydride linkages randomly linked to hydrophobic anhydride linkages attached to aromatic ring carbon atoms. The hydrophilic anhydride linkages are easily cleaved by hydrolysis and thus cause phase separation. At least in some cases, this is believed to cause a too rapid rate of hydrolytic cleavage at storage temperatures above 0° C.

3. Description of Related Art

The following prior art references are disclosed in accordance with the terms of 37 CFR 1.56, 1.97 and 1.98.

K. W. Leong et al., "Synthesis of Polyanhydrides: Melt-Polycondensation, Dehydrochlorination and Dehydrative Coupling" published in Macromolecules, 20(4), 705–712, (April, 1987), disclose a variety of polyanhydrides including terephthalic homopolyanhydrides of bis (carboxyphenoxy) alkanes, terephthalic acid, sebacic acid and glutaric acid, and copolyanhydrides of bis (carboxyphenoxy) alkanes with sebacic acid, and terephthalic acid with adipic or sebacic acid.

K. W. Leong et al, "Polyanhydrides for Controlled Release of Bioactive Agents," published in Biomaterials 1986, Vol. 7, September, 364–371, disclose the use of homopolyanhydrides of bis (carboxyphenoxy) alkanes and terephthalic acid, and copolyanhydrides of each of the latter dicarboxylic acids with sebacic acid, as controlled release agents for drugs in the form of polymer matrices containing the drug.

U.S. Pat. No. 4,546,152, issued October 8, 1985 to Koelmel et al., discloses the dimethyl ester of 4-carboxymethoxybenzoic acid, the corresponding 1,2 and 1,3-isomers, and the corresponding diacids. Cited in the specification of this patent is U.S. Pat. No. 4,510,295 issued to Bezwada et al, which discloses polymers, apparently polyesters, derived from 4-(carboxymethoxy) benzoic acid and glycolide and/or lactide.

Kito et al., Kogyo Kagaku Zasshi 1971, 74(11), 2313-15 (abstracted in C.A. 76(9): 45892c, 1972) teach the preparation of omega (p-carboxyphenoxy) alkanoic acids and their methyl esters.

Shamilov et al., Deposited Doctoral Dissertation SPSTL Khp-D82, 6 pages (1982) (abstracted in C.A. 101(3): 23072t) teach the synthesis and study of derivatives of 4-carboxy-1-phenoxyacetic acid.

SUMMARY OF THE INVENTION

In accordance with this invention, there are provided homopolyanhydrides of carboxyaryloxy alkanoic acids capable of being formed into shaped articles. The homopolyanhydride is preferably produced by first making a mixed anhydride of the carboxyaryloxy alkanoic acid and acetic acid as a prepolymer and subsequently forming the homopolyanhydride from the prepolymer by melt-polycondensation accompanied by liberation of acetic anhydride.

Each repeating unit of the homopolyanhydrides of this invention, as provided by the carboxyaryloxy alkanoic acid monomer, contains one terminal hydrophilic anhydride linkage attached to the ring carbon atom of an aromatic group and another terminal anhydride linkage attached to a hydrophobic aliphatic carbon atom. Such a structure is believed to contribute to a greater uniformity of the rate of hydrolytic cleavage of the polymer at different temperatures. This property contributes to the suitability of the homopolyanhydride as a polymer matrix providing for the controlled release of a drug or other agent.

DESCRIPTION OF PREFERRED EMBODIMENTS

The homopolyanhydrides of this invention are formed from carboxyaryloxyalkanoic acids having the following formula:

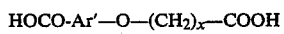

$$HOCO-Ar'-O-(CH_2)_x-COOH$$

wherein Ar' is a divalent arylene group, preferably a phenylene or naphthylene group, wherein the ring carbon atoms not bonded to the carboxyl group or the etheric oxygen linked to the alkanoic acid moiety of the molecule, are either unsubstituted, i.e., are bonded to hydrogen atoms, or are bonded to substituents which are inert under the conditions of use of the homopolyanhydride except for possibly affecting the rate of hydrolytic cleavage, and x is at least 1, preferably 1 to 10 and most preferably 1 to 5. Substituents on the aromatic ring carbon atoms which may be employed are for example alkyl or alkoxy having 1 to 5 carbon atoms. The more preferred arylene groups are 1,4-phenylene and 2,6-naphthylene and the most preferred is 1,4-phenylene.

Specific carboxyaryloxyalkanoic acids, which may be used as monomers in the preparation of the homopolyanhydrides of this invention are, for example, p-carboxyphenoxyacetic acid, 6-(p-carboxyphenoxy) hexanoic acid, 3-(p-carboxyphenoxy) propionic acid, 6-carboxynaphthyl-2-oxyacetic acid 6-(6'-carboxynaphthyl-2'-oxy) hexanoic acid and 3-(6'-carboxynaphthyl-2'-oxy) propionic acid.

The carboxyaryloxyalkanoic acid monomer may be prepared by any method known in the art, e.g., the methods disclosed in the previously cited Kito et al. and Shamilov et al. articles and U.S. Pat. No. 4,546,152. A particularly suitable method is the heating of an aqueous alcoholic solution of the appropriate hydroxy aromatic carboxylic acid, e.g., hydroxybenzoic or hydroxynaphthoic acid, and the appropriate bromoalkanoic acid with sodium hydroxide at reflux temperatures, for a period of time to effect the desired condensation reaction.

As stated, the homopolyanhydride is preferably synthesized by first forming a mixed anhydride of the desired carboxyaryloxyalkanoic acid monomer and acetic acid as prepolymer, and subsequently forming the homopolyanhydride by melt polycondensation of the prepolymer. The prepolymer may be formed, for example, by dissolving the monomer in excess acetic anhydride in an inert atmosphere such that the solution contains, for example, about 5 to 20 wt. % of monomer, and heating the solution at total reflux for a period adequate to liberate acetic anhydride and form the desired prepolymer, e.g., about 10 to 30 min. The prepolymer is then separated by conventional methods of filtration, evaporation and washing. The formation of the prepolymer may be characterized by Equation (I):

where Ar' and x have the definitions given previously and n (average degree of oligomerization) has a value of at least 1, preferably 1 to about 10. Since the position of the bracketed repeating units in the chain of the mixed anhydride prepolymer is random, such group may also be represented randomly in the formula of Equation I and Equation II shown subsequently as:

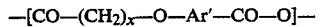

The homopolyanhydrides of the invention may be prepared, for example, by melt-polycondensing the described prepolymer, e.g., by heating the prepolymer in an inert atmosphere under vacuum until the desired homopolyanhydride is formed. This may be done at a temperature, for example, of about 150° to 200° C. for a period of about 50 to 90 min. while drawing off acetic anhydride formed during the reaction. The polymer may then be washed with an appropriate solvent.

The formation of the homopolyanhydride from the prepolymer may be represented by Equation (II):

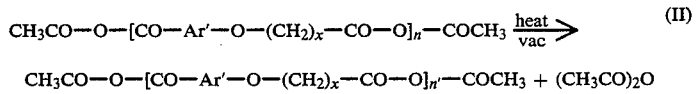

wherein Ar', x and n have the definitions given previously, and n' (average degree of polymerization) has a value of at least about 80, preferably about 90 to 200. As is the case with the mixed anhydride prepolymer, the bracketed repeating units of the homopolyanhydride are in a random arrangement in the polymer chain and thus may also be represented randomly in the formula of Equation (II) as:

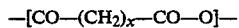

The homopolyanhydrides of this invention can be mixed in the form of their melt with an agent such as a drug, herbicide, fungicide or insecticide and the resultant blend formed into microspheres by slowly pouring the molten blend into silicone oil which had been warmed to the same temperature, as disclosed in the second Leong et al. article cited previously. The homopolyanhydride in such microspheres acts as a controlled release agent for the active agent blended therewith as a result of its gradual hydrolytic cleavage under ordinary conditions. The homopolyanhydrides may also be melt-, dry-, or wet-extruded into sutures subject to controlled dissolution, or, mixed with a treating agent, into films suitable for skin patches which again are subject to a controlled rate of hydrolytic cleavage with accompanying liberation of the treating agent. Finally, the homopolyanhydride blended with a treating agent may be melt, dry, or wet spun into fibers which can be formed into non-woven articles suitable for wound dressings which, as a result of their hydrolytic degradation, release the treating agent at a controlled rate.

The following examples further illustrate the invention.

EXAMPLE 1

This example illustrates the formation of a homopolyanhydride of p-carboxyphenoxyacetic acid (CPA).

The monomeric dicarboxylic acid, p-carboxyphenoxyacetic acid, was synthesized as follows. To a solution of 48.0 g (1.2 mole) sodium hydroxide in 2.0 liter of ethanol and 0.3 liter of water was added 27.6 g (0.2 mole) of freshly recrystallized p-hydroxybenzoic acid, and stirred for a few minutes during which time all the solids went into solution. The mixture was heated to reflux and slowly 82.5 g (0.6 mole) of bromoacetic acid was added through the dropping funnel (in about 60 minutes). The refluxing was continued for an additional 2.5 hours. During this period copious amounts of sodium bromide precipitated out of the solution. The reaction mixture was then allowed to cool and the solids were filtered off. The filtrate was evaporated in a rotary evaporator, the resulting residue was dissolved in water, and acidified with dil. HCl to a pH of 2. The precipitated solids were filtered and washed thoroughly with cold water, dried in a vacuum oven at 40° C. overnight to obtain 16.6 g of pure product: the m.p. of the diacid was found to be 280° C. The nmr and IR analyses of the product were in good agreement with the expected structure.

A prepolymer of the foregoing monomeric CPA was prepared as follows:

In a 3-neck flask equipped with mechanical stirrer, and condenser was placed 160 ml of acetic anhydride under argon atmosphere. The acetic anhydride was heated to reflux and 15.0 g of p-carboxyphenoxyacetic acid (CPA) was added rapidly with stirring. All the solids dissolved in acetic anhydride. The solution was refluxed for an additional 20 minutes and cooled. The solution was filtered to remove any insoluble impurities in an argon glove box. The clear filtrate was then evaporated under vacuum almost to dryness to obtain a gel-like residue. The residue was further washed several times with petroleum ether to remove any traces of acetic anhydride. The resulting 8.0 g of white powder was found to be a pure CPA prepolymer by nmr and IR spectroscopic analysis, with an average degree of oligomerization of 1.3 ("n" in Equation I).

The homopolyanhydride of the CPA of this example was prepared as follows:

In a 3-neck flask equipped with mechanical stirrer, condenser, and a vacuum distillation set-up was placed 8.0 g of pure CPA prepolymer, prepared as described, under argon atmosphere. The distillation condenser was attached to a manifold which was connected to an argon source and an vacuum pump so that the reaction flask could be either kept under argon or in vacuum by properly switching the manifold to the desired state. The flask was then immersed into a preheated oil bath at 180° C. As soon as the solids started to melt, vacuum was applied and slowly stirring was turned on. The acetic anhydride started to condense immediately and the melt became more and more viscous. The reaction flask was maintained at 180° C. for about an hour during which time the bubbling of the syrupy mass completely stopped. The flask was allowed to cool after covering with an aluminum foil to avoid any shattering of the flask due to contraction of the polymer in the glove box and washed thoroughly with methylene chloride to remove any soluble impurities. The resulting product was not soluble in any chlorinated hydrocarbon solvents, but dissolved in dimethyl sulfoxide with hydrolysis to starting diacid. The IR spectrum of the product corresponded to aromatic, aromatic-aliphatic, and aliphatic-aliphatic anhydride linkages suggesting random polymerization of the head to tail ends of the molecule. Analysis by nmr indicates an average degree of polymerization, ($n'$ in Equation II) of at least about 100.

EXAMPLE 2

This example illustrates the formation of a homopolyanhydride of 6-(p-carboxyphenoxy)hexanoic acid.

Using a similar procedure to Example 1, 6-(p-carboxyphenoxy)hexanoic acid (CPH) of high purity was prepared starting from p-hydroxybenzoic and 6-bromohexanoic acids. CPH prepolymer was synthesized starting from 10.0 g of CPH and 100 ml of acetic anhydride to give a 5.6 g of pure CPH prepolymer which had characteristic nmr and IR patterns. The m.p. was found to be 98°–102° C., and the average degree of oligomerization (n in Equation I) was determined to be about 5.

Employing a procedure similar to that of Example 1, CPH polyanhydride was made from 5.0 g of the foregoing prepolymer. The product was purified by dissolving in 50 ml of methylene chloride, filtering to remove insoluble impurities and coagulating the clear solution with 500 ml of petroleum ether to obtain white, fibrous CPH polyanhydride, yield 3.7 g. The polymer showed excellent film forming properties and expected structural characteristics as studied by nmr and IR analysis. The IR spectrum clearly showed that the polymer has random head to tail sequence. Its degree of polymerization ($n'$ in Equation II) was about 100 as indicated by nmr analysis and its glass transition ($T_g$) temperature was found to be 83° C. as determined by differential scanning calorimetry (DSC). The thermal decomposition onset of the polymer was 370° C. under nitrogen by thermogravimetric analysis (TGA).

We claim:

1. A homopolyanhydride of a carboxyaryloxyalkanoic acid, which is capable of being formed into shaped articles.

2. The homopolyanhydride of claim 1 having the formula:

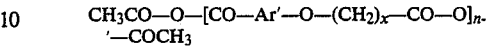

wherein Ar' is a divalent arylene group, x is 1 to 10 and n' is at least about 80.

3. The homopolyanhydride of claim 2 wherein Ar' is 1,4-phenylene or 2,6-naphthylene, x is 1 to 5 and n' is about 90 to 200.

4. The homopolyanhydride of claim 3 wherein Ar' is 1,4-phenylene.

5. The homopolyanhydride of claim 4 which is poly(p-carboxyphenoxyacetic acid).

6. The homopolyanhydride of claim 4 which is poly[6-(p-carboxyphenoxy)hexanoic acid].

7. A prepolymer which is a mixed anhydride of a carboxyaryloxyalkanoic acid and acetic acid.

8. The prepolymer of claim 7 having the formula:

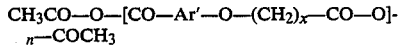

wherein Ar' is a divalent arylene group, x is 1 to 10 and n is 1 to about 10.

9. The prepolymer of claim 8 wherein Ar' is 1,4-phenylene or 2,6-naphthylene and x is 1 to 5.

10. The prepolymer of claim 9 wherein Ar' is 1,4-phenylene.

11. The prepolymer of claim 10 which is a mixed anhydride of p-carboxyphenoxyacetic acid and acetic acid.

12. The prepolymer of claim 10 which is a mixed anhydride of 6-(p-carboxyphenoxy)hexanoic acid and acetic acid.

13. A process of preparing a homopolyanhydride comprising dissolving a carboxyaryloxyalkanoic acid in excess acetic anhydride, heating the solution under refluxing condition for a period sufficient to form a mixed anhydride prepolymer, separating the prepolymer from the reaction solution, and melt polycondensing said prepolymer by heating it in an inert atmosphere under vacuum while drawing off acetic anhydride formed during the reaction, until the desired homopolyanhydride is obtained.

14. The process of claim 13 wherein said carboxyaryloxyalkanoic acid is p-carboxyphenoxyacetic acid.

15. The process of claim 14 wherein said carboxyaryloxyalkanoic acid is 6-(p-carboxyphenoxy)hexanoic acid.